United States Patent [19]

Strobel

[11] Patent Number: 5,123,792
[45] Date of Patent: Jun. 23, 1992

[54] BLIND FASTENER WITH WASHER FOR COMPOSITE MATERIAL

[75] Inventor: Burton C. Strobel, Warminster, Pa.

[73] Assignee: SPS Technologies, Inc., Newtown, Pa.

[21] Appl. No.: 645,369

[22] Filed: Jan. 24, 1991

[51] Int. Cl.⁵ .................................. F16B 13/06
[52] U.S. Cl. ........................ 411/55; 411/43; 411/54
[58] Field of Search .......... 411/55, 43, 44, 34, 411/35, 36, 37, 38, 42, 39, 41, 69, 70, 54; 403/408.1

[56] References Cited

U.S. PATENT DOCUMENTS

| | | |
|---|---|---|
| 4,168,650 | 9/1979 | Dahl . |
| 4,364,697 | 12/1982 | Binns ............. 411/38 |
| 4,579,491 | 4/1986 | Kull .............. 411/43 |
| 4,595,324 | 6/1986 | Sadri ............. 411/38 |
| 4,747,202 | 5/1988 | Beals ............. 29/437 |
| 4,752,169 | 6/1988 | Pratt ............. 411/43 |
| 4,772,167 | 9/1988 | Beals ............. 411/43 |
| 4,832,548 | 5/1989 | Strobel .......... 411/42 |
| 4,877,363 | 10/1989 | Williamson ..... 411/43 |
| 4,900,205 | 2/1990 | Sadri ............. 411/38 |

Primary Examiner—Rodney M. Lindsey
Attorney, Agent, or Firm—James D. Dee; Aaron Nerenberg

[57] ABSTRACT

This invention relates to an improved blind fastener assembly and an improved joint assembly using the blind fastener assembly. The blind fastener assembly is adapted to be installed in a workpiece having a first and a second surface with an opening therebetween. The blind fastener is of the type having a core pin, expander means, expandable sleeve means, and resilient washer means, each having an initial diameter which permits it to pass through the opening in the workpiece. The improvement in the blind fastener assembly in accordance with this invention comprises the washer means having two portions including an inner portion and an integrally formed outer flange portion. The inner portion has a tapered nose section tapering outwardly away from the core pin shank portion to facilitate expansion of the sleeve means over the inner portion. The integrally formed outer flange portion is adapted to be unfolded by the sleeve means to form a bearing surface against the second surface of the workpiece. Advantageously, the washer means inner portion is thick-walled and the outer flange portion is thin-walled. Furthermore, the washer means outer flange portion has a wall thickness of generally from about 0.2 to about 0.5 times the combined wall thicknesses of the washer means inner portion and outer flange portion. The washer means can also have a leading internal surface inclined outwardly to facilitate the expansion of the washer means over the expander means tapered nose portion.

20 Claims, 3 Drawing Sheets

BLIND FASTENER WITH WASHER FOR COMPOSITE MATERIAL

BACKGROUND OF THE INVENTION

1. Field of the Invention

This invention generally relates to improvements in blind fasteners and the joints produced therewith and, more particularly, to improved blind fasteners with washers.

2. Description of the Prior Art

Advanced composite materials have recently been gaining increasing usage in various aerospace applications because they offer potential weight savings and increased stiffness. The anisotropic properties of composite materials present a unique opportunity to optimize certain structural designs such as elongated aircraft stringers and ribs. In order to form acceptable joints of relatively thin sheet composite materials, conventional blind fasteners have not proven to be completely acceptable.

One reason is the low allowable bearing stress of composite materials which means that the full tensile strength of the blind fastener may not be realized because of bearing failure of the composite material. Present blind fasteners have a relatively limited blind side bearing area and typically expand to approximately 1.3 times the original sleeve diameter. Another reason is that composite materials are weaker in shear, thus causing any holes to require greater edge distances and more area buildup to develop full efficiency of the composite material.

Advanced composite materials are constructed of a resin matrix which has a tendency to crack when holes in the material are expanded, such as by cold working or by an interference fit fastener. Rivets which swell when upset may also crack the resin matrix. Finally, fasteners which form against the blind side composite material surface tend to damage the relatively soft material surface by digging or gouging out some of the material during the bearing surface formation process. Additionally, fasteners which form against the blind side composite material surface may cause stress concentrations during the formation process which exceed the compressive strength limit of such materials, thus causing damage.

Some blind fasteners taught by the prior art form a bearing surface on the blind side of the workpiece before contact is made with the workpiece. However, such fasteners have not proven entirely satisfactory for a variety of reasons, including problems associated with consistently and reliably forming the bearing surface before contact with the workpiece. Additionally, some conventional blind fasteners cannot conform to the irregular contour of the composite material blind surface and tend to crush the raised points of the material, thus reducing overall material strength.

A prior art design for a blind fastener providing an enlarged bearing area is disclosed in U.S. Pat. No. 4,579,491 issued Apr. 1, 1986 to Kull. In Kull, a sleeve and a coil washer expanded over a tapered nose to form a bearing surface. While the fastener does provide a large bearing surface and is insensitive to variations in grip length, the core pin of this fastener is necessarily smaller in diameter than may be preferred, therefore exotic high strength materials are sometimes required to provide this fastener with a preselected strength.

Strobel U.S. Pat. No. 4,832,548, discloses another prior art blind fastener assembly suitable for use in joint assemblies including advanced composite material workpieces. This blind fastener assembly has a core pin, an expander, and a sleeve, each having an initial diameter which permits it to pass through a hole in a workpiece. The core bolt has a head at one end and a shank extending therefrom. The sleeve has a primary portion and a secondary portion, the secondary portion being provided with a frustoconical region interconnected with the main portion by a circular web of material. The sleeve is fitted over the shank of the core pin with the primary portion abutting the head of the core pin. The expander is provided with a tapered nose portion at one end and a head at its other end. The expander is mounted to the shank with the nose portion abutting the secondary portion of the sleeve.

In use, this blind fastener assembly is passed through a hole in a workpiece, or aligned holes in two or more workpieces, until the head of the expander abuts the access side of the joint. Relative longitudinal movement of the core pin and the expander forces the tapered nose into the sleeve and causes it to expand. As the sleeve expands, the web between the primary and secondary portions of the sleeve shears. When the secondary portion of the sleeve abuts the blind side of the workpiece, the continued relative longitudinal movement of the core bolt and the expander causes the primary portion of the sleeve to expand over the frustoconical region of the secondary portion of the sleeve until the primary portion also abuts the blind side of the workpiece. Furthermore, in the preferred embodiment, an expandable washer is mounted to the shank of the core bolt between the sleeve and the expander. The washer is expanded over the tapered nose of the expander ahead of the sleeve such as to form a protective bearing surface between the respective sleeve portions and the workpiece, thereby further minimizing potential damage to the workpiece material during the formation of the joint.

However, this design suffers from several deficiencies. For example, a certain amount of load is necessary during installation in order to shear the web of this design so that the sleeve shears into two pieces. But inconsistent installation and performance problems may result since consistent web shear cannot be achieved (i.e. the web does not shear in exactly the same place with respect to the nose portion of the expander with each installation). The thickness of the web varies because of manufacturing tolerances, thereby causing variation in the shear load. This is a significant problem with smaller sizes. In some cases, the web may not shear until the washer and sleeve assembly contact the workpiece, which increases the washer forming load. In addition, uneven shearing may result if the web thickness is not concentric or of uniform thickness, thereby allowing the secondary portion of the sleeve to cock on the expander. In other words, the uneven advancement of the sleeve may cause the web to shear on one side of the expander before shearing on the other side or the shearing of the web may cause the advancement to be uneven. Also, if the web does not shear until the sleeve and washer contact the workpiece, the washer may wrap around the top of the secondary portion of the sleeve which is away from the workpiece, thereby resulting in a folded washer with a reduced bearing contact.

Although U.S. Pat. No. 4,832,548 teaches the use of a type of washer in certain embodiments of the blind fastener assembly disclosed therein, it has been discovered that if this washer is too short or does not extend beyond the cylindrical region of the secondary sleeve portion, such as illustrated in FIG. 5 of the above-mentioned patent, the requisite forming load would be high. If the washer is too long or extends to the primary sleeve portion, such as illustrated in FIG. 6 of the above-mentioned patent, the requisite forming load would also be high because the primary portion is contained. Therefore, the forming load could exceed the failure strain limit, possibly resulting in the cracking or tearing of the washer.

Furthermore, a portion of the web having a ragged or irregular surface remains on the primary portion of the sleeve after the sleeve shears into two pieces. This irregular portion can cut into the washer during or after installation and eventually damage the composite material. Additionally, the sleeve is typically manufactured from stainless steel which is passivated to minimize corrosion. The exposed shear surfaces on both the primary and secondary portions of the sleeve are subject to greater corrosion since they present non-passivated surfaces to the environment. Moreover, a dry film lubricant is commonly applied to the blind fasteners to assist in installation, and the exposed shear surfaces with this design will lack any such lubricant after shearing occurs, thereby increasing the forming load and making installation more difficult. The complexity of the sleeve design with a web also makes it more difficult to inspect and adds to the manufacturing cost. Manufacturing variations in the web have a significant effect on installation reliability. The improved blind fastener with a washer in accordance with the present invention overcomes these deficiencies.

SUMMARY OF THE INVENTION

This invention relates to an improved blind fastener assembly and an improved joint assembly using the blind fastener assembly. The blind fastener assembly is adapted to be installed in a workpiece having a first and a second surface with an opening therebetween. The blind fastener is of the type having a core pin, expander means, expandable sleeve means, and resilient washer means, each having an initial diameter which permits it to pass through the opening in the workpiece. The core pin includes a shank portion formed to pass through the opening in the workpiece and an enlarged head at one end thereof. The expander means includes an enlarged head at one end thereof formed to bear against the first surface of the workpiece. The expander means also includes a tapered nose portion at the other end thereof, and a shank portion therebetween. The expander means has a bore therethrough adapted to receive the shank portion of the core pin. Further, the expander means is adapted to fit into and extend through the opening in the workpiece wherein the nose portion extends beyond the second surface of the workpiece. The expandable sleeve means is carried on the core pin shank portion between the nose portion of the expander means and the end of the core pin which passes through the opening in the workpiece. The expandable sleeve means is operably engaged with the core pin such that the core pin causes the sleeve means to advance toward the second surface of the workpiece. The sleeve means is adapted to expand over the expander means tapered nose portion. The resilient washer means is carried on the core pin shank portion between the expander means and the sleeve means. The sleeve means is adapted to force the washer means to expand over the expander means and over the tapered nose portion until the washer means bears against the second surface of the workpiece.

The improvement in the blind fastener assembly in accordance with this invention comprises the washer means having two portions including an inner portion and an integrally formed outer flange portion. The inner portion has a tapered nose section tapering outwardly away from the core pin shank portion to facilitate expansion of the sleeve means over the inner portion. The integrally formed outer flange portion is adapted to be unfolded by the sleeve means to form a bearing surface against the second surface of the workpiece. Advantageously, the washer means inner portion is thick-walled and the outer flange portion is thin-walled. Furthermore, the washer means outer flange portion has a wall thickness of generally from about 0.2 to about 0.5 times the combined wall thicknesses of the washer means inner portion and outer flange portion. The washer means can also have a leading internal surface inclined outwardly to facilitate the expansion of the washer means over the expander means tapered nose portion.

Upon installation, the washer means inner portion is disposed between the sleeve means and the expander means and the washer means outer flange portion is disposed between the second surface of the workpiece and the end of the sleeve means facing the workpiece when the washer means is unfolded and bears against the second surface of the workpiece. Advantageously, the washer means outer flange portion unfolds to form a bearing surface having an outer diameter generally from about 1.34 to about 1.60 times the outer diameter of the expander means.

The present invention provides for consistent and reliable installation of the blind fastener assembly. The present invention also eliminates shearing load during installation and provides a more rigid design. Additionally, this invention eliminates irregular surfaces on the sleeve portion of the assembly, thereby avoiding damage to the composite material. Moreover, the present invention eliminates any nonpassivated surfaces that are exposed to the environment and subject to greater corrosion. This invention is also relatively inexpensive to manufacture, easy to inspect, assemble and install, and it eliminates unfinished surfaces that lack a drive film lubricant for installation purposes.

Accordingly, it is an object of the present invention to provide an improved blind fastener with a washer. It is a further object of the present invention to provide a blind fastener that is easy to assemble and provides reliable installation and performance. It is also an object of the present invention to provide an improved blind fastener with a washer that eliminates shearing load and provides a more rigid design. It is an additional object of the present invention to provide an improved blind fastener with a washer that has no exposed, non-passivated shear surfaces and no irregular surfaces on the sleeve. It is another object of the present invention to provide an improved blind fastener with a washer that is relatively inexpensive to manufacture and easy to inspect.

These and many other objects, features and advantages of the present invention will become apparent to those skilled in the art when the following description of the preferred embodiments is read in conjunction with the drawings appended hereto.

BRIEF DESCRIPTION OF THE DRAWINGS

In the drawings, where like reference numerals refer to like elements throughout.

FIG. is a partly cutaway side elevational view of the joint assembly of FIG. 1 wherein the blind fastener assembly is in a fully installed condition with the washer thereof bearing against the blind side surface of one of the workpieces.

DESCRIPTION OF THE PREFERRED EMBODIMENTS

Figure 1:
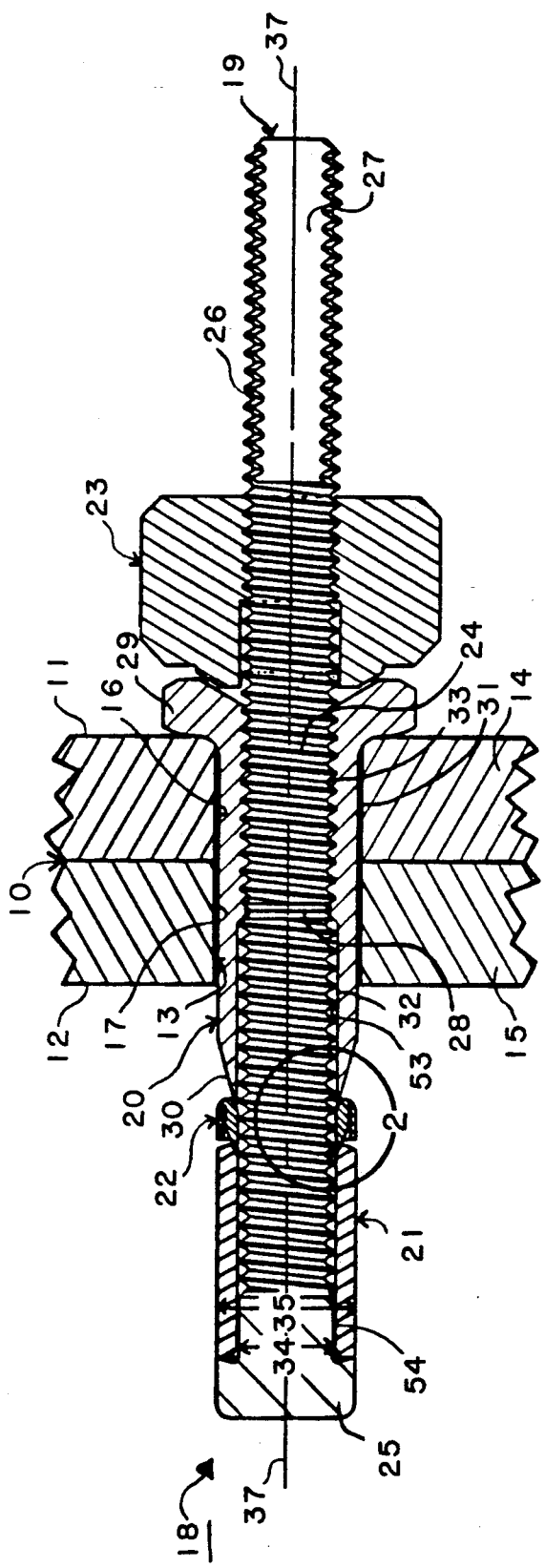
FIG. 1 is a cross sectional view, with parts in elevation, illustrating an example of a joint assembly according to the present invention consisting of a pair of workpieces and a blind fastener assembly in accordance with the present invention installed in aligned holes in the pair of workpieces prior to any forming operation.

Referring now to the drawings, FIGS. 1 through 7 illustrate a joint assembly according to the present invention in varying stages of installation. A workpiece 10 is provided with a first surface 11 and a second surface 12 with an opening 13 therebetween. More particularly, the workpiece 10 can be comprised of panels 14 and 15 with aligned holes 16 and 17 accepting a blind fastener assembly 18 in accordance with the present invention. Except for the novel features of the invention disclosed herein, the assembly 18 can generally be the type of blind fastener assembly adapted to be installed in a workpiece disclosed in the above-mentioned U.S. Pat. No. 4,832,548, the disclosure of which is incorporated by reference herein.

The blind fastener assembly 18 has a core pin or core bolt 19, and expander 20, an expandable sleeve 21 and a resilient washer 22. A drive nut 23 can also be utilized with the assembly 18. The core pin 19 includes a shank portion 24 formed to pass through the opening 13 in the workpiece 10 and an enlarged head 25 at one end thereof. External threads 26 are disposed on the shank portion 24 extending from the enlarged head 25. Torque tool engaging means 27 can be formed on the shank 24 of the core pin 19 on the opposite end of the pin 19 from the enlarged head 25. The torque tool engaging means 27 can be wrenching flats or other appropriate configuration adapted for engagement by a torque tool. A breakneck groove 28 or localized weakened region may be provided at an axial location along the core pin 19. The pin 19 is adapted to shear at groove 28 at a point near the enlarged head 29 of the expander 20 after the fastener is fully set.

The expander 20 includes an enlarged head 29 at one end thereof. The enlarged head 29 is formed to bear against the first surface 11 of the workpiece 10. The expander 20 also has a tapered nose portion 30 disposed at the other end thereof, opposite from the head 29. Between the head 29 and nose portion 30, the expander 20 is provided with a shank portion 31 having a cylindrical surface which is about the same outer diameter as the main portion of the sleeve 21, as illustrated in FIG. 1. The expander 20 further has a bore 32 therethrough and an internally threaded portion 33 engageable with the externally threaded shank portion 26 of the core pin 19. The expander 20 can also have an unthreaded counterbore 53 to accommodate an unthreaded portion 54 of the core pin 19. Thus, the expander 20 is adapted to receive the pin's shank portion 24, and to fit into and extend through the opening 13 in the workpiece 10 so that the nose portion 30 extends beyond the workpiece's second surface 12 upon installment.

The sleeve 21 is carried on the core pin's shank portion 24 between the expander's nose portion 30 and the end or head 25 of the Core pin 19 which passes through the opening 13 in the workpiece 10. The sleeve 21 abuts against the core pin's enlarged head 25, and the sleeve 21 is operably engaged with the core pin 19 such that the core pin 19 causes the sleeve 21 to advance toward the workpiece's second surface 12. Also, the sleeve 21 is adapted to expand over the expander's tapered nose portion 30.

Figure 2:
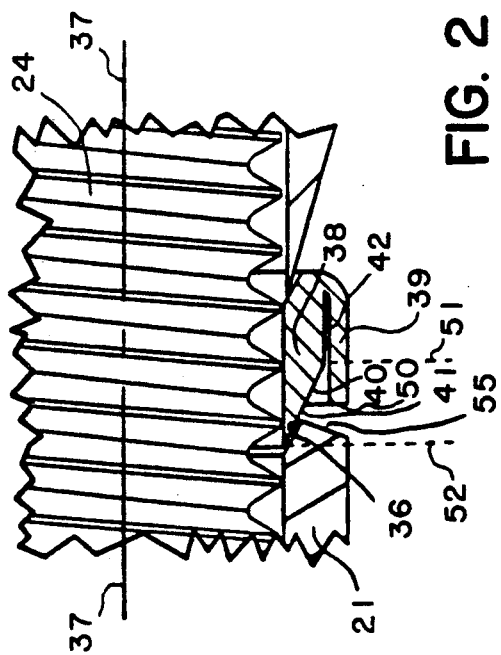
FIG. 2 is an enlarged view of the portion of the assembly of FIG. 1 taken in the Circle 2 in FIG. 1 and depicting sections of the expandable sleeve and resilient washer in accordance with the present invention.
Figure 3:
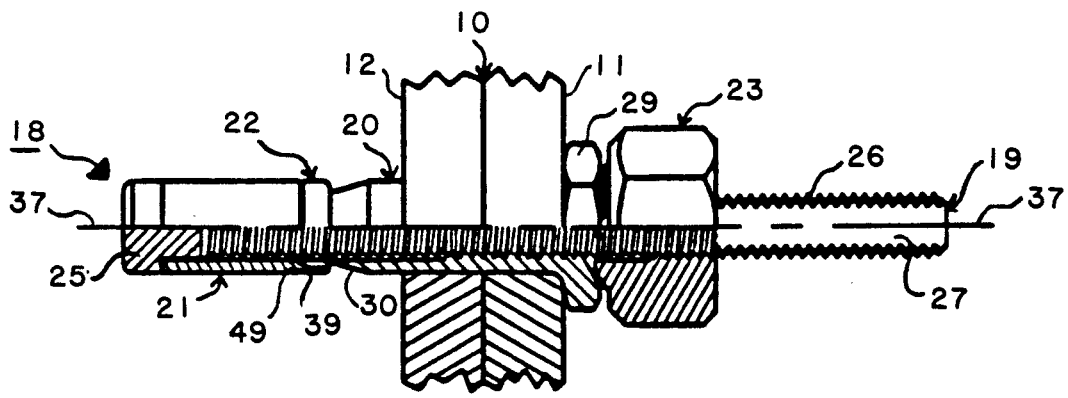
FIG. 3 is a partly cutaway side elevational view of the joint assembly of FIG. 1 wherein the blind fastener assembly is in a position prior to the initiation of a forming operation.
Figure 7:
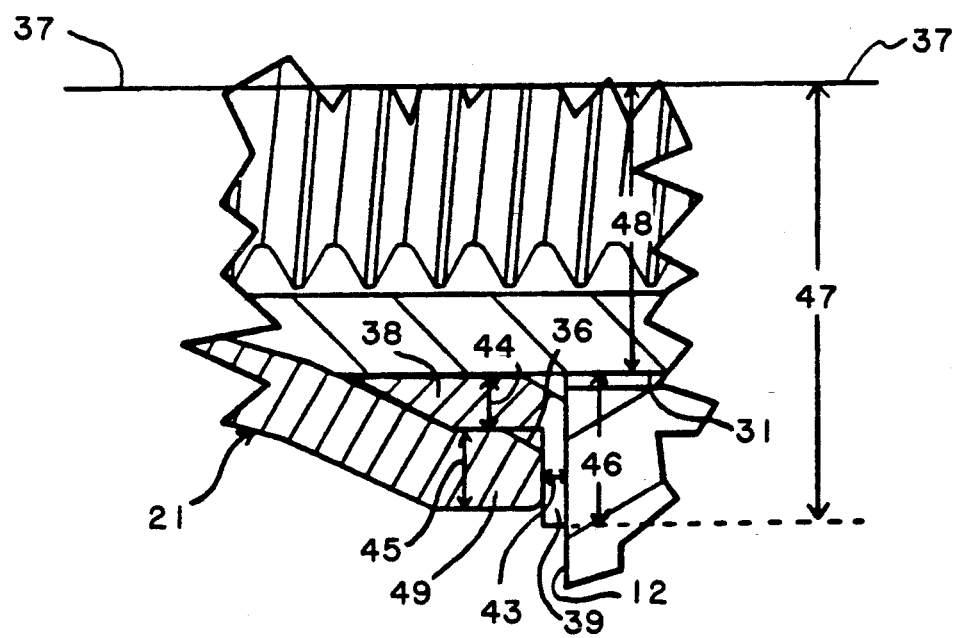
FIG. 7 is an enlarged view of the portion of the assembly of FIG. 6 taken in the Circle 7 in FIG. 6 and depicting sections of the expandable sleeve and resilient washer in accordance with the present invention.

Importantly, unlike the sleeve of the prior art fastener described in the above-cited U.S. Pat. No. 4,832,548, the sleeve 21 of the present invention is not frangible with a web between primary and secondary portions which shears upon installation. Rather, the sleeve 21 of the present invention is of generally uniform inner diameter 34 and outer diameter 35, and the sleeve 21 does not shear upon installation. Preferably, as illustrated in FIGS. 2 and 7, the sleeve 21 has a smooth leading internal surface 36 inclined outwardly at a preselected angle in relation to the longitudinal axis 37 of the expander 20 or blind fastener assembly 18. This preselected angle can be from about 10° to about 60°. The internal surface 36 can also be a radiused chamfer. The internal surface 36 facilitates expansion of the sleeve 21 over the expander's tapered nose portion 30 and inner portion 38 of the washer 22. Also, it is preferred that the sleeve 21 has a bevel 55 on the leading edge of the sleeve 21 to cooperate with the outer flange portion 39 of the washer 22 such as to smoothly open the outer flange portion 39 upon installment.

The resilient washer 22 is carried on the core pin shank portion 24 between the expander 20 and the sleeve 21. The sleeve 21 is adapted to force the washer 22 to expand over the expander 20 and over the tapered nose portion 30 until the washer 22 bears against the workpiece's second surface 12. In accordance with the present invention, the washer 22 has two portions including a thick-walled inner portion 38 and an integrally formed thin-walled outer flange portion 39. The inner portion 38 has a smooth tapered nose section 40 tapering outwardly away from the core pin shank portion 24 to facilitate expansion of the sleeve 21 over the inner portion 38.

More particularly, the inner portion 38 is comprised of a first surface 41 inclined at a preselected angle in relation to the longitudinal axis 37 of the expander 20 or assembly 18 and a second surface 42 generally parallel to the longitudinal axis 37. The first surface 41 facilitates the sleeve's 21 expansion over the inner portion 38. Preferably, the first surface's preselected angle is from about 15° to about 45° and, most preferably, the angle is about 27°. Furthermore, in order to help ensure a reliable installation, the end 50 of the outer flange portion 39 away from the workpiece 10 must be located between the intersection 51 of the inner portion's first surface 41 and second surface 42 and the terminus 52 of the inner portion's first surface 41 away from the workpiece 10 so that the outer flange portion 39 is longer than the intersection 51 yet shorter than the first surface's terminus 52, as illustrated in FIG. 2.

The washer's outer flange portion 39 is adapted to be unfolded by the sleeve 21 to form a bearing surface against the workpiece's second surface 12, as illustrated in FIG. 7. The outer flange portion 39 has a wall thickness 43 of from 0.2 to 0.5 times the sum of the washer inner portion wall thickness 44 plus the washer outer flange portion wall thickness 43. Also, the sleeve wall thickness 45 plus the washer inner portion wall thickness 44 is generally equal to or slightly less than the distance 46 from the exterior of the expander's shank portion 31 to the outer edge of the washer flange portion 39. Moreover, the washer flange portion 39 unfolds to form a bearing surface having an outer diameter 47 from 1.34 to 1.60 times the outer diameter 48 of the expander 20. In accordance with the present invention, the washer inner portion 38 and outer flange portion 39 cooperate with sufficient strength to enable the washer 22 to expand over the expander 20 and over the tapered nose portion 30 until the outer flange portion 39 unfolds to form a bearing surface against the workpiece's second surface 12 at a desired clamp load.

The core pin 19 is threadedly engaged with the expander 20 so that rotation of the core pin 19 causes advancement of the sleeve 21 towards the workpiece's second surface 12. The assembly 18 can also have a drive nut 23 threadedly mounted on the core pin 19. The drive nut 23 can also be adapted to prevent rotation of the expander 20 when the core pin 19 is rotated to cause advancement of the sleeve 21 towards the workpiece's second surface 12. For example, the drive nut's bearing surface (not illustrated) can have tabs which engage in recesses in the expander's head 29, thereby preventing rotation of the expander 20 when the core pin 19 is rotated.

As illustrated in FIGS. 3–6, during installation of the blind fastener assembly 18, appropriate rotation of the core pin 19 with respect to the expander 20 draws the pin's enlarged head 25 toward the workpiece 10 and also draws the sleeve 21 toward the expander 20. The torque tool engaging means 27, such as a pair of flats, is included on the pin 19 for accepting a tool driving bit, not illustrated but well known in the art. It should be understood that the pin 19 may alternatively include a plurality of circumferential grooves (not shown) in place of external threads 26 and the mating threads 33 on the expander 20. Such grooves are commonly employed on similar pulling pin devices and are formed to be gripped by any one of a number of conventional pull-type guns for exerting the necessary axial force on core pin 19. This alternate arrangement is not illustrated because it is quite conventional and fully known to those skilled in the art.

Figure 4:
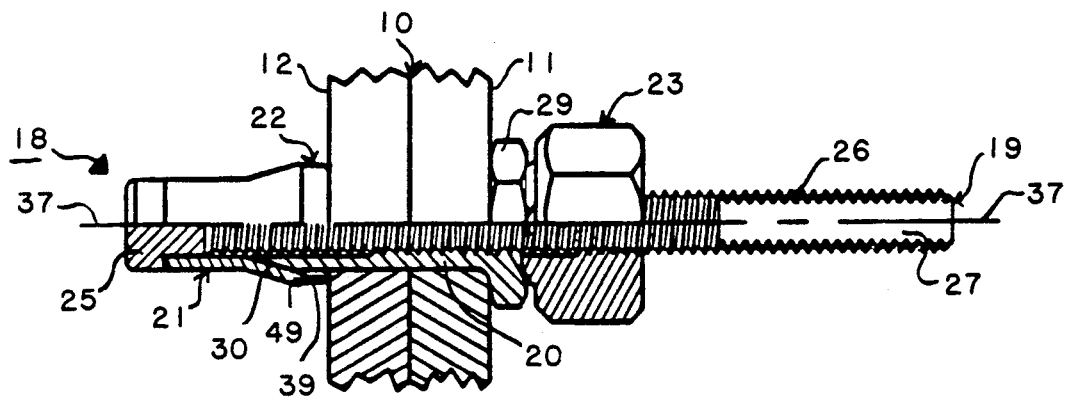
FIG. 4 is a partly cutaway side elevational view of the joint assembly of FIG. 1 wherein the blind fastener assembly is in a first intermediate position during a forming operation.

During installation of the blind fastener assembly 18, the core pin 19 is caused to move axially so as to draw the head 25 of the pin 19 toward the expander 20 and, hence, workpiece 10. Such movement is caused when an axial force is exerted on the core pin 19 by exerting a torque on the pin 19 or by pulling on the core pin 19 by means of a pull-gun (not shown). Referring to FIG. 4, as the core pin 19 is advanced through the workpiece 10, the washer 22 is brought into contact with the end of the expander's tapered nose portion 30. Continued advancement of core pin 19 causes the nose portion 30 of expander 20 to force the sleeve 21 and the washer 22 to expand over the tapered nose portion 30. The leading end 49 of the sleeve 21 is also brought into contact with the smooth tapered nose section 40 of the washer's inner portion 38 and the end of the washer's outer flange portion 39 as the washer 22 begins to expand but before the washer 22 contacts the workpiece 10, thereby helping to prevent undesired buckling of the flange portion 39.

Figure 5:
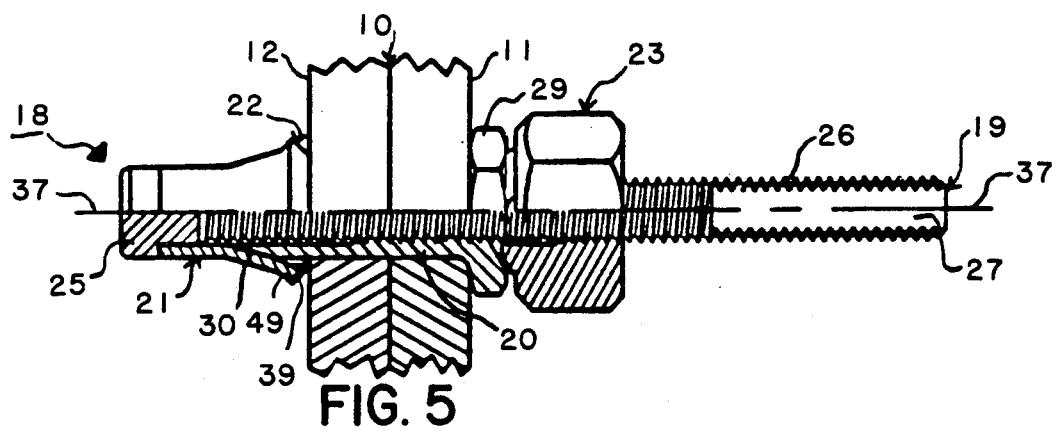
FIG. 5 is a partly cutaway side elevational view of the joint assembly of FIG. 1 wherein the blind fastener assembly is in a second intermediate position during a forming operation.
Figure 6:
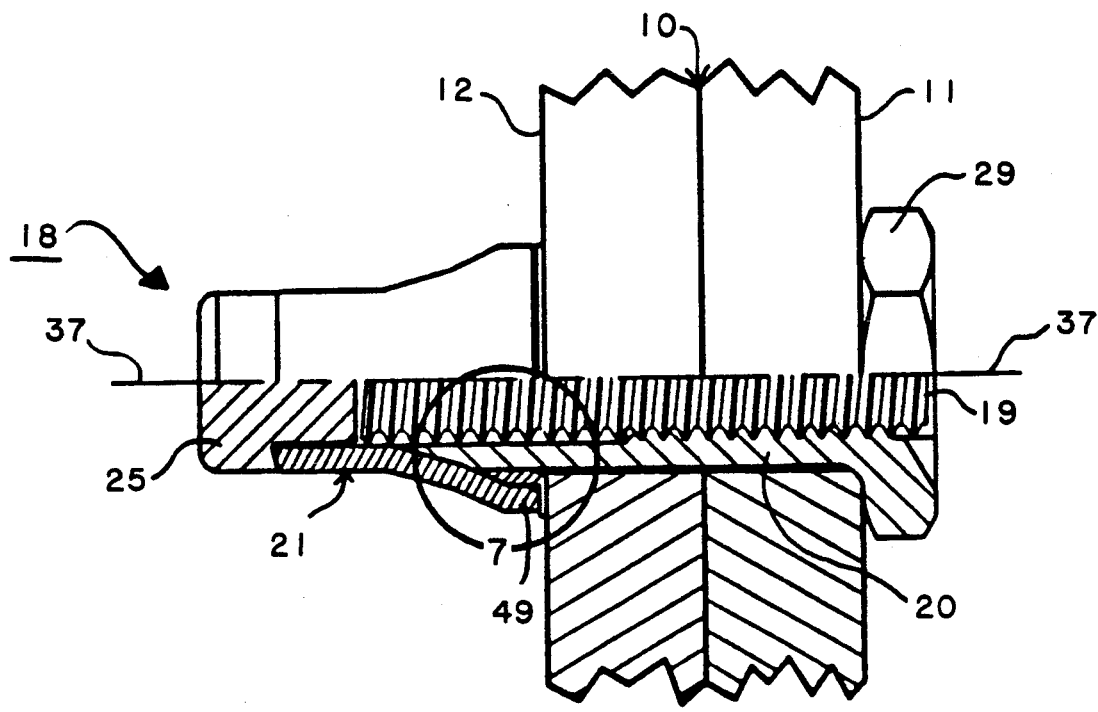

As illustrated in FIG. 5, continued movement of the head 25 and the sleeve 21 toward the workpiece 10 causes the sleeve 21 to expand over the inner portion 38 of the washer 22. The washer 22 is opened by the leading end 49 of the sleeve 21 and of workpiece 10, and the washer's outer flange portion 39 unfolds to form a bearing surface against the workpiece's second surface 12, as is shown in FIG. 6. Advancement of the core pin 19 through the workpiece 10 is continued subsequent to the seating of washer 22 against workpiece 10, until the desired preload is reached. Thereupon, the shank 24 of the core pin 19 may fracture at the suitably dimensioned breakneck groove 28.

It should be understood that some form of locking configuration (not shown) may be provided between the core pin 19 and the expander 20 to keep the pin 19 from moving in an axial direction after the joint is formed, and to maintain the desired preload in the joint. Examples of such a locking configuration could be a prevailing torque feature between the mating threads or any one of the numerous known conventional locking features.

Significantly, unlike the prior art fastener with a frangible sleeve described in U.S. Pat. No. 4,832,548, the washer and sleeve in accordance with the present invention eliminate the problem presented by inconsistent groove shear and shearing force variations since there is no groove in the sleeve and no shearing necessary to install the fastener. The force directed to shearing and separating the two portions of the frangible sleeve of the prior art fastener is fully directed to unfolding and setting the washer of the present invention. Thus, the load required to unfold the present invention's washer is lower than the load required to separate the prior art's frangible sleeve, and thereby the risk of damage to the workpiece is minimized. There is also less risk with this invention that the washer will be trapped and partially folded. Moreover, more of the core pin's strength can be utilized to develop clamp load in the joint. Accordingly, the present invention provides a more reliable installation, particularly with blind fasteners having smaller dimensions.

The present invention also eliminates any ragged or irregular surfaces which could damage the composite material. Additionally, the present invention eliminates any exposed, non-passivated surfaces which could be subject to greater corrosion. Furthermore, a dry film lubricant is commonly applied to the sleeves of blind fasteners to assist in installation. The sleeve in accordance with the present invention does not have any exposed shear surfaces which would lack such lubricant after shearing. Therefore, this invention provides an improved blind fastener which is easier to assemble and install.

Heretofore, the blind fastener assembly in accordance with the present invention has been described as being particularly well-suited for use with advanced composite materials. However, it should be understood that this invention can also be used with conventional materials with equally effective results.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. In a blind fastener assembly adapted to be installed in a workpiece having a first and a second surface with an opening therebetween, said blind fastener being of the type having: a core pin including a shank portion formed to pass through the opening in the workpiece and an enlarged head at one end thereof; expander means including an enlarged head at one end thereof formed to bear against the first surface of the workpiece, a tapered nose portion at the other end thereof, and a shank portion therebetween, said expander means having a bore therethrough adapted to receive said shank portion of said core pin and being adapted to fit into and extend through the opening in the workpiece wherein said nose portion extends beyond the second surface of the workpiece; expandable sleeve means carried on said core pin shank portion between said nose portion of said expander means and the end of said core pin which passes through the opening in the workpiece, said expandable sleeve means being operably engaged with said core pin such that said core pin causes said sleeve means to advance toward the second surface of the workpiece, said sleeve means being adapted to expand over said expander means tapered nose portion; and a resilient washer means carried on said core pin shank portion between said expander means and said sleeve means, said sleeve means being adapted to force said washer means to expand over said expander means and over said tapered nose portion until said washer means bears against the second surface of the workpiece, the improvement comprising:

said washer means having two portions including an inner portion with a tapered nose section tapering outwardly away from said core pin shank portion to facilitate expansion of said sleeve means over said inner portion and an integrally formed outer flange portion adapted to be unfolded by said sleeve means to form a bearing surface against the second surface of the workpiece.

2. The blind fastener assembly according to claim 1 wherein said washer means inner portion is thick-walled and said washer means outer flange portion is thin-walled.

3. The blind fastener assembly according to claim 1 wherein said washer means outer flange portion has a wall thickness of generally from about 0.2 to about 0.5 times the combined wall thicknesses of said washer means inner portion and washer means outer flange portion.

4. The blind fastener assembly according to claim 1 wherein said washer means has a leading internal surface inclined outwardly to facilitate expansion of said washer means over said expander means tapered nose portion.

5. The blind fastener assembly according to claim 1 wherein said washer means inner portion is disposed between said sleeve means and said expander means and said washer means outer flange portion is disposed between said second surface of the workpiece and the end of said sleeve means facing the workpiece when said washer means is unfolded and bears against the second surface of the workpiece.

6. The blind fastener assembly according to claim 1 wherein said washer means outer flange portion unfolds to form a bearing surface having an outer diameter generally from about 1.34 to about 1.60 times the outer diameter of said expander means.

7. In a joint assembly of the type comprised of: a workpiece having a first and a second surface with an opening therebetween, a core pin including a shank portion formed to pass through the opening in said workpiece and an enlarged head at one end thereof; expander means including an enlarged head at one end thereof formed to bear against the first surface of said workpiece, a tapered nose portion at the other end thereof, and a shank portion therebetween, said expander means having a bore therethrough adapted to receive said shank portion of said core pin and being adapted to fit into and extend through the opening in the workpiece wherein said nose portion extends beyond the second surface of the workpiece; expandable sleeve means carried on said core pin shank portion between said nose portion of said expander means and the end of said core pin which passes through the opening in the workpiece, said expandable sleeve means being operably engaged with said core pin such that said core pin causes said sleeve means to advance toward the second surface of the workpiece, said sleeve means being adapted to expand over said expander means tapered nose portion; and a resilient washer means carried on said core pin shank portion between said expander means and said sleeve means, said sleeve means being adapted to force said washer means to expand over said expander means and over said tapered nose portion until said washer means bears against the second surface of the workpiece, the improvement comprising:

said washer means having two portions including an inner portion with a smooth tapered nose section tapering outwardly away from said core pin shank portion to facilitate expansion of said sleeve means over said inner portion and an integrally formed outer flange portion adapted to be unfolded by said sleeve means to form a bearing surface against the second surface of the workpiece.

8. The joint assembly according to claim 7 wherein said washer means inner portion is thick-walled and said washer means outer flange portion is thin-walled, said washer means outer flange portion having a wall thickness of from about 0.2 to about 0.5 times the combined wall thicknesses of said washer means inner portion and washer means outer flange portion.

9. The joint assembly according to claim 7 wherein said washer means has a leading internal surface inclined outwardly to facilitate expansion of said washer means over said expander means tapered nose portion.

10. The joint assembly according to claim 7 wherein said washer means inner portion is disposed between said sleeve means and said expander means and said washer means outer flange portion is disposed between said second surface of the workpiece and the end of said sleeve means facing the workpiece when said washer means is unfolded and bears against the second surface of the workpiece.

11. The joint assembly according to claim 7 wherein said washer means outer flange portion unfolds to form a bearing surface having an outer diameter generally from about 1.34 to about 1.60 times the outer diameter of said expander means.

12. The joint assembly according to claim 7 wherein said sleeve means has a smooth leading internal surface inclined outwardly to facilitate expansion of said sleeve means over said expander means tapered nose portion and over said washer means inner portion.

13. The joint assembly according to claim 7 wherein said core pin is threadedly engaged with said expander means so that rotation of said core pin causes advancement of said sleeve means towards the second surface of the workpiece.

14. The joint assembly according to claim 7 wherein said assembly further comprises a drive nut threadedly mounted on said core pin, said drive nut being adapted to prevent rotation of the expander means when said core pin is rotated to cause advancement of said sleeve means towards the second surface of the workpiece.

15. In a blind fastener assembly adapted to be installed in a workpiece having a first and a second surface with an opening therebetween, said blind fastener being of the type having: a core pin including a shank portion formed to pass through the opening in the workpiece and an enlarged head at one end thereof; expander means including an enlarged head at one end thereof formed to bear against the first surface of the workpiece, a tapered nose portion at the other end thereof, and a shank portion therebetween, said expander means having a bore therethrough adapted to receive said shank portion of said core pin and being adapted to fit into and extend through the opening in the workpiece wherein said nose portion extends beyond the second surface of the workpiece; expandable sleeve means carried on said core pin shank portion between said nose portion of said expander means and the end of said core pin which passes through the opening in the workpiece, said expandable sleeve means being operably engaged with said core pin such that said core pin causes said sleeve means to advance toward the second surface of the workpiece, said sleeve means being adapted to expand over said expander means tapered nose portion; and a resilient washer carried on said core pin shank portion between said expander means and said sleeve means, said sleeve means being adapted to force said washer to expand over said expander means and over said tapered nose portion until said washer bears against the second surface of the workpiece, the improvement comprising:

said washer having two portions including a thick-walled inner portion with a first surface inclined at a first preselected angle in relation to the longitudinal axis of said expander means and a second surface generally parallel to said longitudinal axis, said first surface facilitating expansion of said sleeve means over said washer inner portion, and an integrally formed thin-walled outer flange portion adapted to be unfolded by said sleeve means to form a bearing surface against the second surface of the workpiece, said washer outer flange portion having a wall thickness of from 0.2 to 0.5 times the combined thicknesses of said washer inner portion and washer outer flange portion.

16. The blind fastener assembly according to claim 15 wherein said first preselected angle is from about 15° to about 45°.

17. The blind fastener assembly according to claim 15 wherein said washer outer flange portion unfolds to form a bearing surface having an outer diameter from 1.34 to 1.60 times the outer diameter of said expander means.

18. The blind fastener assembly according to claim 15 wherein said washer inner portion and outer flange portion cooperate with sufficient strength to enable said washer to expand over said expander means and over said tapered nose portion until said washer outer flange portion unfolds to form a bearing surface against the second surface of the workpiece at a desired clamp load.

19. The blind fastener assembly according to claim 15 wherein said sleeve means is of generally uniform inner and outer diameters, said sleeve means further having a leading internal surface inclined outwardly at a second preselected angle in relation to said longitudinal axis, said internal surface facilitating expansion of said sleeve means over said expander means tapered nose portion and said washer inner portion.

20. The blind fastener assembly according to claim 15 wherein said core pin is threadedly engaged with said expander means so that rotation of said core pin causes advancement of said sleeve means towards the second surface of the workpiece, and wherein said assembly further comprises a drive nut threadedly mounted on said core pin, said drive nut being adapted to prevent rotation of the expander means when said core pin is rotated to cause advancement of said sleeve means towards the second surface of the workpiece.

* * * * *